US011804750B2

(12) United States Patent
Akiyama

(10) Patent No.: US 11,804,750 B2
(45) Date of Patent: Oct. 31, 2023

(54) ELECTRIC DEVICE AND MOTOR

(71) Applicant: MEIDENSHA CORPORATION, Tokyo (JP)

(72) Inventor: Hiromichi Akiyama, Tokyo (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 17/912,285

(22) PCT Filed: Mar. 9, 2021

(86) PCT No.: PCT/JP2021/009178
§ 371 (c)(1),
(2) Date: Sep. 16, 2022

(87) PCT Pub. No.: WO2021/187222
PCT Pub. Date: Sep. 23, 2021

(65) Prior Publication Data
US 2023/0131087 A1    Apr. 27, 2023

(30) Foreign Application Priority Data
Mar. 19, 2020  (JP) ................. 2020-049262

(51) Int. Cl.
*H02K 5/20* (2006.01)
*H02K 11/33* (2016.01)
*H02K 5/10* (2006.01)
*H02K 9/19* (2006.01)
*H02P 27/06* (2006.01)

(52) U.S. Cl.
CPC .............. *H02K 5/203* (2021.01); *H02K 5/10* (2013.01); *H02K 9/19* (2013.01); *H02K 11/33* (2016.01); *H02P 27/06* (2013.01)

(58) Field of Classification Search
CPC ........... H02K 5/20; H02K 5/203; H02K 9/19; H02K 9/193
USPC .......................................................... 310/54
See application file for complete search history.

(56) References Cited

U.S. PATENT DOCUMENTS

2014/0232217 A1    8/2014  Miyama et al.
2019/0150328 A1    5/2019  Miura et al.
2019/0229583 A1*   7/2019  Dextraze ................. H02K 1/187

FOREIGN PATENT DOCUMENTS

CN    109412348 A  *  3/2019  ............. F04B 17/03
CN    109428442 A  *  3/2019
JP    2005-030428 A     2/2005
(Continued)

OTHER PUBLICATIONS

Machine translation of CN-109412348-A (Year: 2019).*
Machine translation of JP-2016174500-A (Year: 2016).*
Machine translation of CN-109428442-A (Year: 2019).*

*Primary Examiner* — Quyen P Leung
*Assistant Examiner* — Minki Chang
(74) *Attorney, Agent, or Firm* — Foley & Lardner LLP

(57) ABSTRACT

The motor includes a sealing material (dry body of a liquid gasket 41) interposed between a joint surface 3b of a motor housing 3 and a joint surface of an inverter housing, and an O-ring 39. The O-ring 39 is interposed between the motor housing 3 and the inverter housing and disposed so as to surround the communication port 3a1 of the refrigerant flow path 3a. The motor housing 3 includes a groove 3d disposed between the sealing material and the O-ring 39 on the joint surface 3b in a surface direction of the joint surface 3b.

5 Claims, 10 Drawing Sheets

(56) References Cited

FOREIGN PATENT DOCUMENTS

| | | | |
|---|---|---|---|
| JP | 2006-197781 A | | 7/2006 |
| JP | 2016-049000 A | | 4/2016 |
| JP | 2016-174500 A | | 9/2016 |
| JP | 2016174500 A | * | 9/2016 |
| JP | 2019-091784 A | | 6/2019 |
| WO | WO-2013/042486 A1 | | 3/2013 |

* cited by examiner

ELECTRIC DEVICE AND MOTOR

BACKGROUND OF THE INVENTION

Field of the Invention

The present invention relates to an electric device such as a motor, and a motor.

Description of the Related Art

Conventionally, there is known an electric device including a first housing and a second housing, and each of the first housing and the second housing includes a joint surface joined to each other and a liquid path serving as a refrigerant flow path.

For example, a motor as an electric device described in JP 2006-197781 A includes a motor unit and an inverter unit. The motor unit includes a motor case as a first housing, and a rotating shaft, a rotor, and a stator housed in the motor case. The inverter unit includes an inverter case as a second housing, and a capacitor and an inverter circuit housed in the inverter case. The motor case and the inverter case are joined to each other in the rotation axis direction of the rotor.

The motor case includes a motor cooling water passage as a liquid path extending in the rotation axis direction of the rotor. One end of the motor cooling water passage in the rotation axis direction is opened as a drain port, and the other end is opened as a communication port at a joint surface with the inverter case. In addition, the inverter case includes an inverter cooling water passage extending in a direction orthogonal to the rotation axis direction of the rotor and then bent and extending toward the motor case. One end of the inverter cooling water passage is opened as a communication port at a joint surface with the motor case, and the other end is opened as a water supply port. The motor cooling water passage and the inverter cooling water passage communicate with each other through communication ports. The cooling water flowing into the inverter cooling water passage from the water supply port of the inverter case flows through the inverter cooling water passage and then flows into the motor cooling water passage of the motor case. Thereafter, the cooling water flows in the motor cooling water passage and is then discharged to the outside through the drain port.

According to JP 2006-197781 A, in the motor having such a configuration, both the motor unit and the inverter unit can be cooled by the same cooling water circuit.

However, in this motor, in the communicating portion between the motor cooling water passage and the inverter cooling water passage, there is a possibility that the cooling water in the passage leaks out to the inside or the outside of the case from a minute gap formed between the joint surfaces of the two cases. In addition, in this motor, airtightness in the motor case and the inverter case cannot be sufficiently secured.

Therefore, the present inventors have prototyped a prototype provided with an O-ring made of an elastic material and a sealing material made of a liquid gasket. The O-ring of the prototype surrounds the communication port of each cooling water passage while being interposed between the motor case and the inverter case in the communicating portion between the motor cooling water passage and the inverter cooling water passage. The sealing material is interposed between the joint surface of the motor case and the joint surface of the inverter case to seal the inside of the motor case and the inside of the inverter case. According to the prototype having such a configuration, the O-ring surrounding each of the communication port of the motor cooling water passage and the communication port of the inverter cooling water passage seals the minute gap between the joint surfaces of both the cases, whereby the leakage of the cooling water from the gap to the inside and outside of the case can be suppressed. In addition, the sealing member interposed between the joint surfaces of both the cases seals the inside of the motor case and the inside of the inverter case, so that airtightness in the motor case and the inverter case can be enhanced.

However, in this prototype, it has been found that, at the time of joining the motor case and the inverter case, there is a possibility that the sealing material made of the liquid gasket spreads along the joint surface and adheres to the O-ring, and a new problem that deterioration of the O-ring is accelerated by the adhesion may occur. If a solid gasket such as a metal gasket is used instead of the liquid gasket, it is possible to avoid deterioration of the O-ring due to adhesion of the liquid gasket. However, since the solid gasket is more expensive than the liquid gasket, cost reduction cannot be achieved.

Although the problem caused in the configuration including the two housings that communicate the two cooling water passages at the respective joint surfaces has been described, the same problem may occur in the configuration including the housing and the cover that communicate the two liquid paths at the respective joint surfaces. For example, there is known a motor that includes an inverter housing and an inverter cover that closes an opening of the inverter housing, and communicates a liquid path of the inverter housing and a liquid path of the inverter cover at respective joint surfaces of the inverter housing and the inverter cover. Such a motor may also have a similar problem.

SUMMARY OF THE INVENTION

One aspect of the present invention is an electric device including: a housing and a cover that covers an opening of the housing, or a first housing and a second housing, each of the housing and the cover, or each of the first housing and the second housing including a joint surface to be joined to each other, and a liquid path serving as a refrigerant flow path, each liquid path being opened as a communication port at the joint surface and communicating with each other; and a sealing material interposed between each joint surface, and an O-ring, wherein the O-ring is interposed between the housing and the cover or between the first housing and the second housing, and is disposed to surround each communication port of each liquid path communicating with each other, each of the communication port and the O-ring is disposed outside a frame of the sealing material having a frame shape in a surface direction of the joint surface, and at least one of the housing and the cover or at least one of the first housing and the second housing includes a groove disposed between the sealing material and the O-ring on the joint surface in a surface direction of the joint surface.

Further features of the present invention will become apparent from the following description of exemplary embodiments with reference to the attached drawings.

DESCRIPTION OF THE EMBODIMENTS

Hereinafter, an embodiment of a motor to which the present invention is applied will be described with reference to the drawings.

Figure 1:
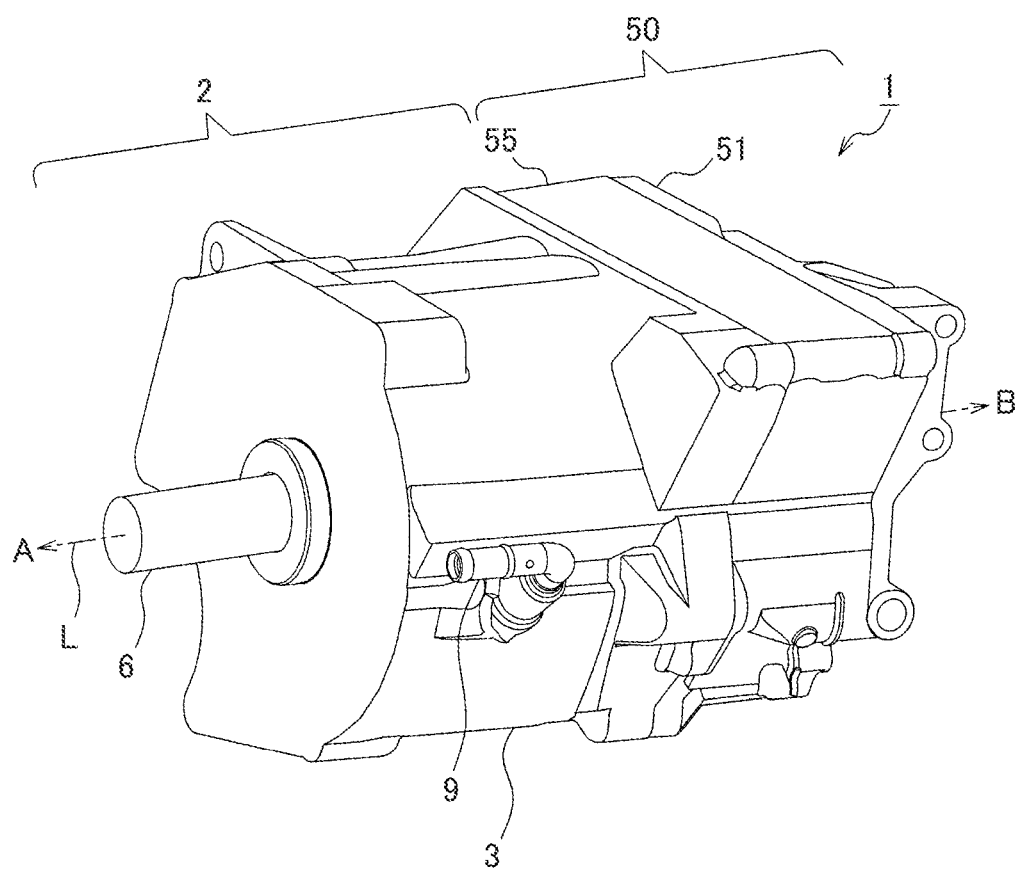
FIG. 1 is a perspective view illustrating a motor according to an embodiment.
Figure 2:
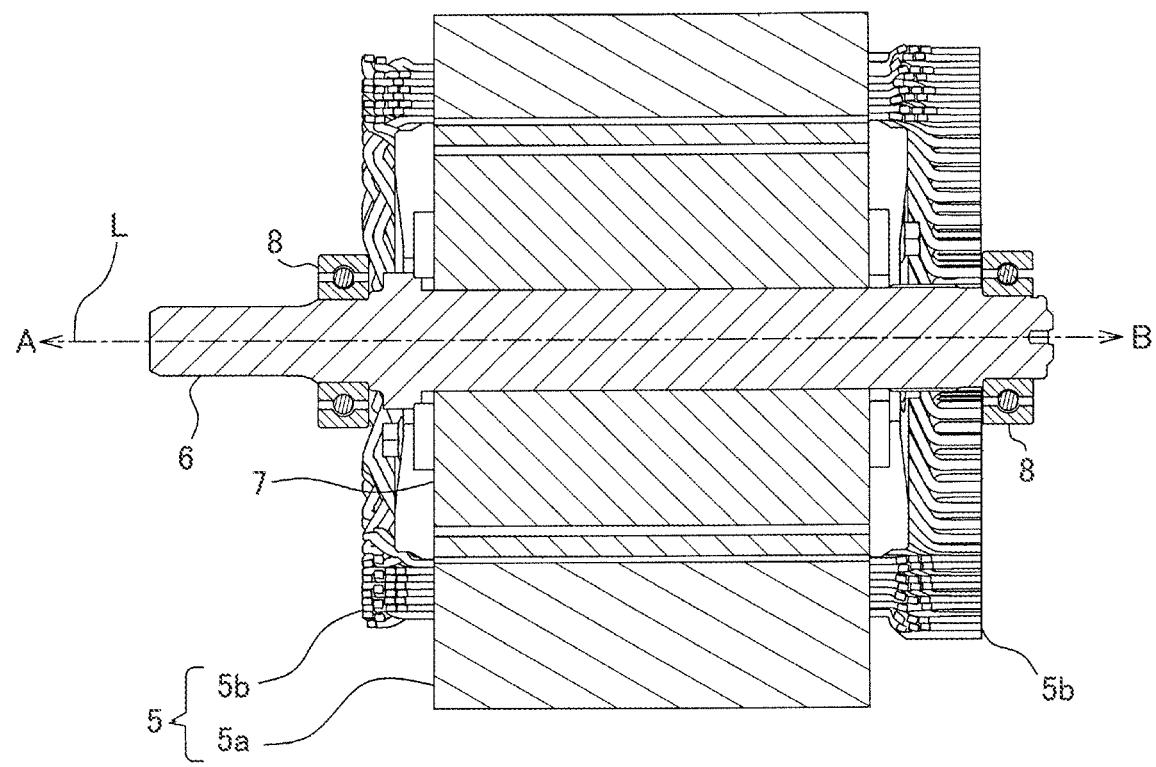
FIG. 2 is a longitudinal cross-sectional view illustrating a shaft, a rotor, and a stator of the motor.

FIG. 1 is a perspective view illustrating a motor 1 according to an embodiment. FIG. 2 is a longitudinal cross-sectional view illustrating a shaft 6, a rotor 7, and a stator 5 of the motor 1. The motor 1 includes a motor unit 2 and an inverter unit 50.

The motor unit 2 includes an interior permanent magnet (IPM) motor, and includes a motor housing 3 illustrated in FIG. 1, and the shaft 6, the rotor 7, and the stator 5 illustrated in FIG. 2. The shaft 6 as a rotating shaft member is supported so as to be rotatable about a rotation axis L indicated by an alternate long and short dash line in the drawing. The extending direction of the rotation axis L is an example of a rotation axis direction in the present invention. The arrow A direction in FIG. 1 is an example of one side in the rotation axis direction in the present invention. The arrow B direction in FIG. 1 is an example of the other side in the rotation axis direction in the present invention.

The central portion of the shaft 6 in the rotation axis direction, the rotor 7, and the stator 5 are housed in a cylindrical hollow of the motor housing 3 as a first housing. One side (arrow A direction side) and the other side (arrow B direction side) of the shaft 6 in the rotation axis direction are rotatably supported by ball bearings 8. Each of the two ball bearings 8 is fixed in the motor housing 3.

The rotor 7 rotates integrally with the shaft 6. The rotor 7 and the central portion of the shaft 6 in the rotation axis direction are disposed in the hollow of the stator 5.

Figure 3:
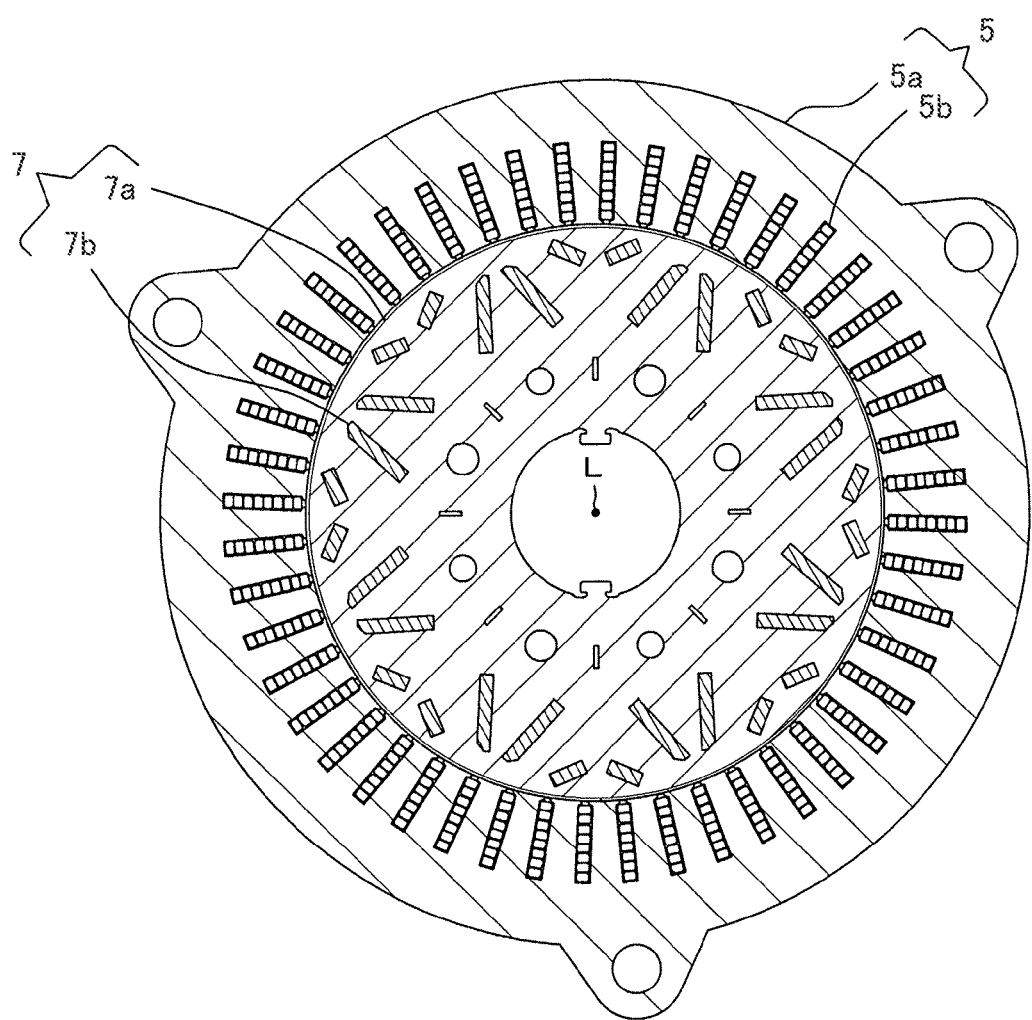
FIG. 3 is a transverse cross-sectional view illustrating the stator and the rotor of the motor.

FIG. 3 is a transverse cross-sectional view illustrating the stator 5 and the rotor 7 of the motor 1. The stator 5 includes a cylindrical stator core 5a and a flat wire coil 5b which is a winding wound around the stator core 5a. The rotor 7 is disposed in the hollow of the stator core 5a. In addition, the rotor 7 includes a rotor core 7a and a plurality of permanent magnets 7b embedded in the rotor core 7a so as to be arranged in the circumferential direction around the rotation axis L of the rotor 7. In FIG. 3, hatching to be applied to the cross section of the flat wire coil 5b is omitted.

Hereinafter, the circumferential direction around the rotation axis L is simply referred to as the circumferential direction. The radial direction around the rotation axis L is simply referred to as the radial direction.

As illustrated in FIG. 1, the motor unit 2 and the inverter unit 50 are adjacent to each other in the rotation axis direction, and the motor housing 3 and the inverter housing 55 are joined to each other in the rotation axis direction. An end on the other side (arrow B direction side) in the rotation axis direction of the inverter housing 55 which is the housing in the present invention and is also the second housing is largely opened toward the other side. This opening is closed by an inverter cover 51 as a cover.

The inverter unit 50 supplies power of a three-phase power supply to the motor unit 2 at a frequency based on a command in accordance with a command sent from a host device such as an engine control unit (ECU) of a vehicle. The inverter unit 50 including the inverter cover 51, the inverter circuit, and the inverter housing 55 is disposed on the other side (arrow B direction side) of the motor unit 2 in the rotation axis direction.

Each of the motor housing 3, the inverter housing 55, and the inverter cover 51 is made of a cast product having a hollow structure. A control substrate and the like are disposed in the hollow of the inverter housing 55. In the inverter cover 51, an insulated gate bipolar transistor (IGBT) module or the like constituting a part of the inverter circuit is disposed.

A liquid supply pipe 9 is connected to the outer peripheral surface of the motor housing 3. Liquid refrigerant such as cooling water sent from a cooling device is supplied into the liquid supply pipe 9.

Figure 4:
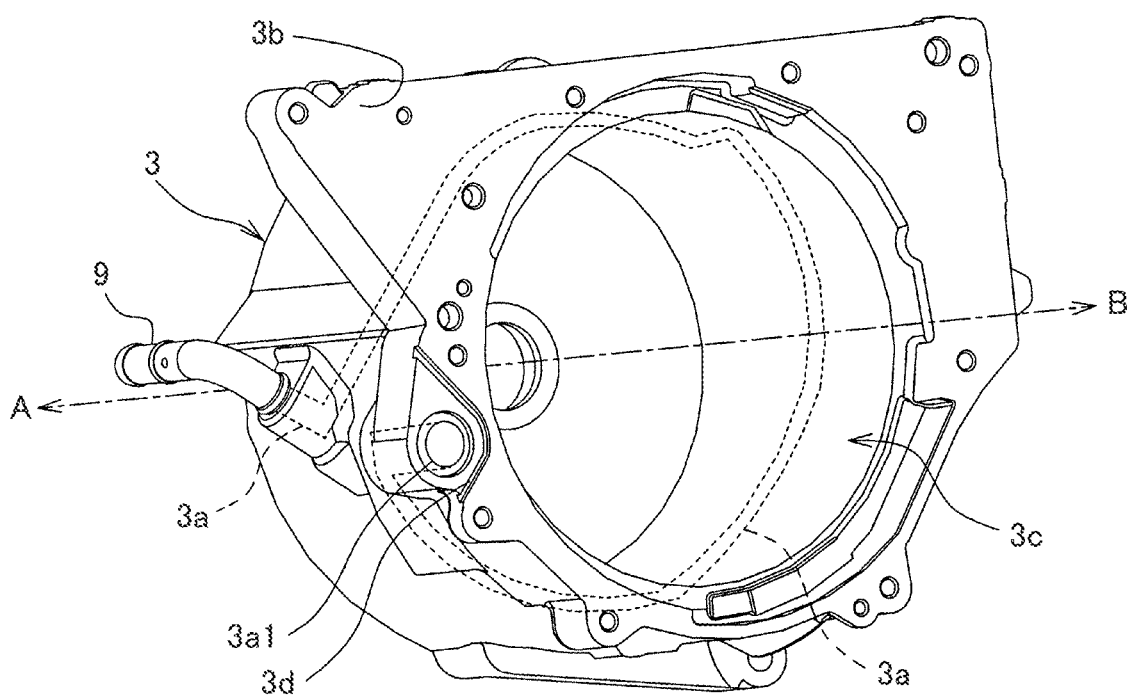
FIG. 4 is a perspective view illustrating a motor housing of the motor from the other side in a rotation axis direction.

FIG. 4 is a perspective view illustrating the motor housing 3 from the other side (arrow B direction side) in the rotation axis direction. The motor housing 3 includes a hollow 3c that houses the stator (5 in FIG. 2) and the rotor (7 in FIG. 2), a refrigerant flow path 3a as a liquid path, and a joint surface 3b joined to the inverter housing (55 in FIG. 1). The refrigerant flow path 3a communicates with the liquid supply pipe 9, extends in the circumferential direction, and then extends from one side (arrow A direction side) toward the other side in the rotation axis direction. The other end of the refrigerant flow path 3a in the rotational axis direction opens toward the other side as a communication port 3a1 on the joint surface 3b.

Figure 5:
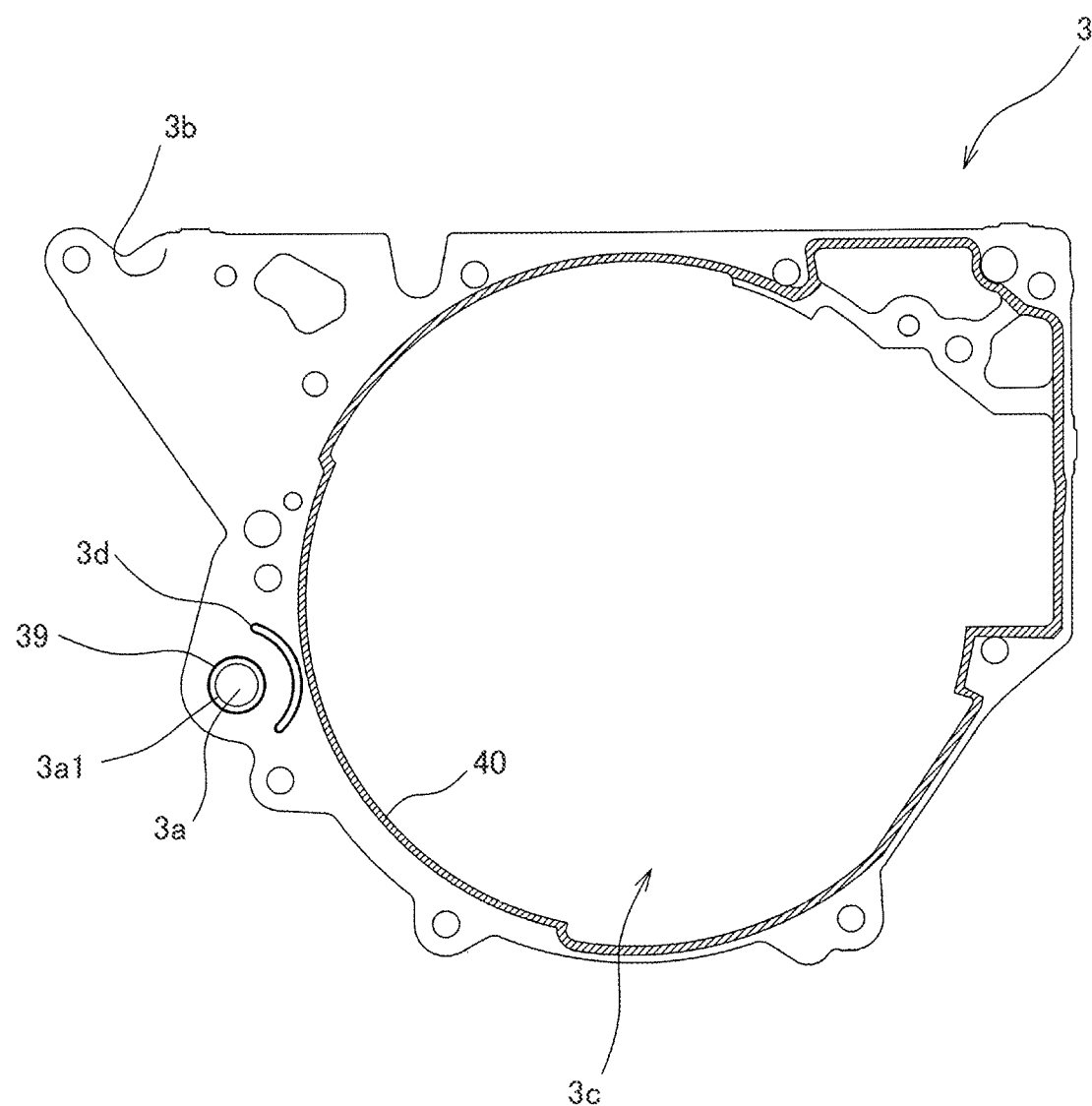
FIG. 5 is a plan view illustrating a joint surface of the motor housing.

FIG. 5 is a plan view illustrating the joint surface 3b of the motor housing 3. On the joint surface 3b, a sealing material 40 made of a dry body of a liquid gasket is disposed so as to surround the hollow 3c with a predetermined width. The sealing material 40 is interposed between the joint surface 3b of the motor housing 3 and a joint surface of the inverter housing described later to seal the hollow 3c of the motor housing 3 and the hollow of the inverter housing, so that airtightness of both housings can be enhanced at low cost. In FIG. 5, the sealing material 40 is hatched for convenience, but the hatching does not indicate the cross section of the sealing material 40. The same applies to a liquid gasket (41) illustrated in FIG. 6 described later. The sealing material 40 is provided to prevent dust and water droplets from entering the motor housing 3 and the inverter housing 55 from the outside.

Figure 6:
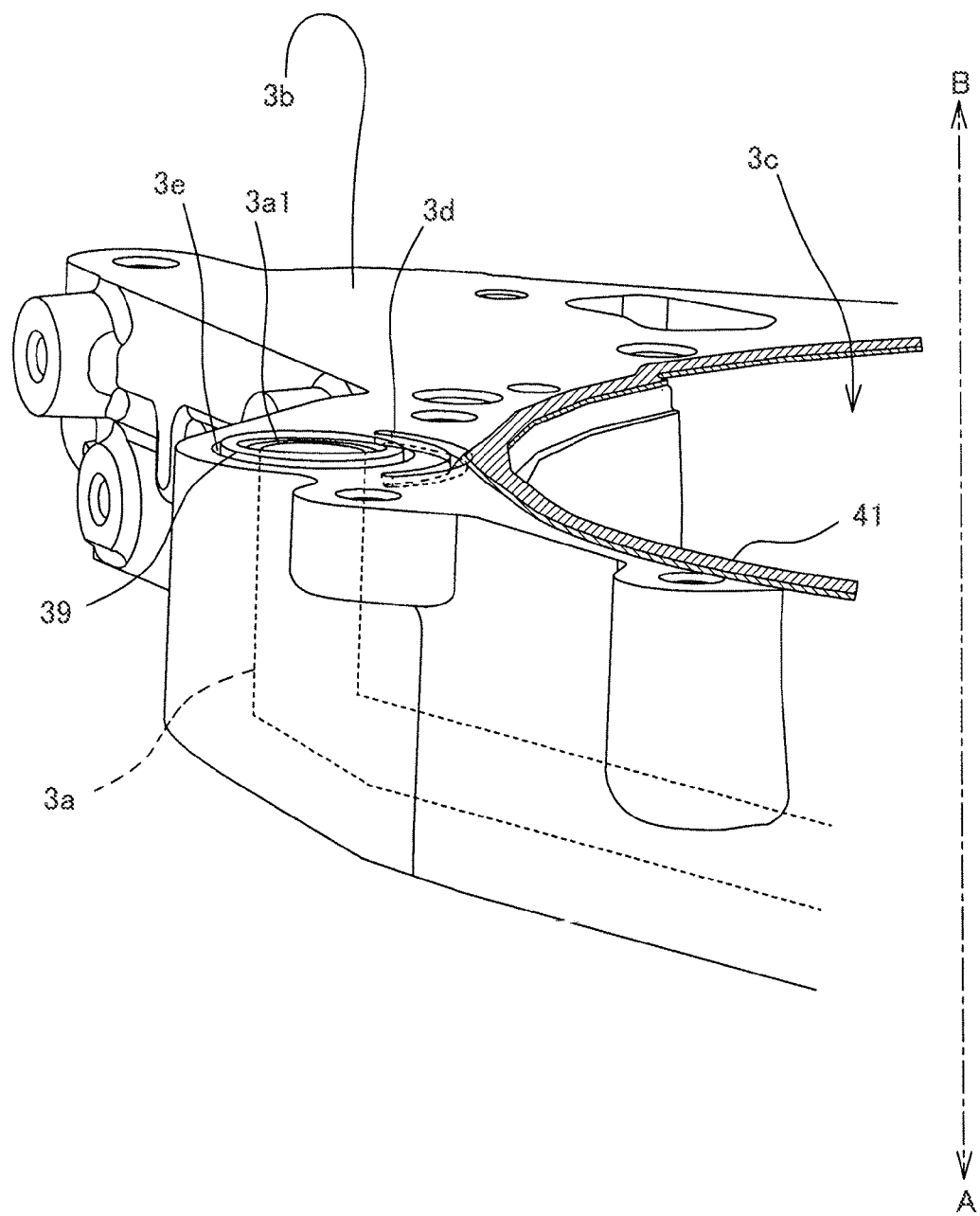
FIG. 6 is an enlarged partial perspective view illustrating a communication port and a periphery thereof in the motor housing.
Figure 7:
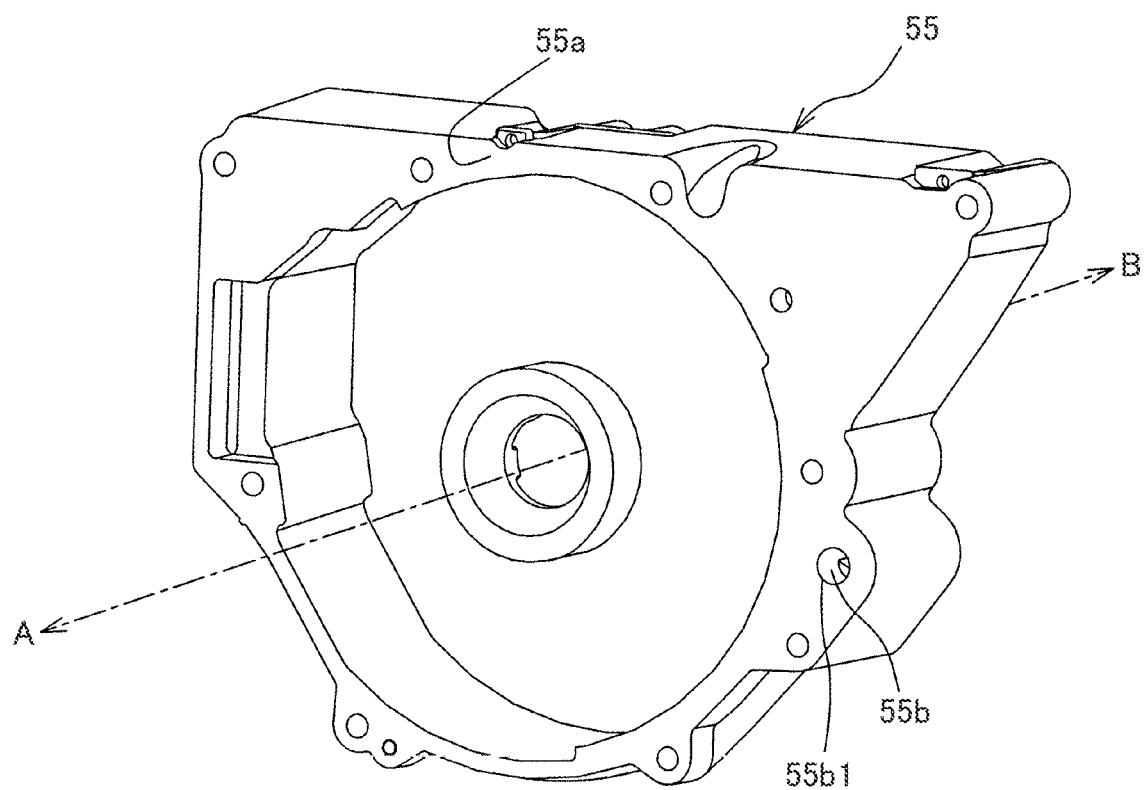
FIG. 7 is a perspective view illustrating an inverter housing of the motor from one side in a rotation axis direction.

FIG. 6 is an enlarged partial perspective view illustrating the communication port 3a1 and the periphery thereof in the motor housing 3. FIG. 7 is a perspective view illustrating the inverter housing 55 from one side (arrow A direction side) in the rotation axis direction. In FIG. 7, for convenience, illustration of the sealing material (40) is omitted. As illustrated in FIG. 6, the motor housing 3 includes an annular groove 3e surrounding the communication port 3a1 of the refrigerant flow path 3*a* on the joint surface 3*b*. An O-ring 39 made of an elastic body such as heat-resistant rubber is set in the annular groove 3*e*.

As illustrated in FIG. 7, the inverter housing 55 includes a joint surface 55*a* joined to the joint surface (3*b* in FIG. 6) of the motor housing, and a refrigerant flow path 55*b* as a liquid path. An end of the refrigerant flow path 55*b* on one side (arrow A direction side) in the rotation axis direction opens toward the one side as a communication port 55*b*1. The motor housing 3 illustrated in FIG. 6 and the inverter housing 55 illustrated in FIG. 7 are fixed to each other by a bolt and a nut in a state where the joint surfaces (3*b* and 55*a*) are joined to each other. Then, the refrigerant flow path 3*a* of the motor housing 3 and the refrigerant flow path 55*b* of the inverter housing communicate with each other through the communication ports (3*a*1 and 55*b*1). The O-ring 39 is interposed between the motor housing 3 and the inverter housing 55 and surrounds the respective communication ports (3*a*1 and 3*b*1) of the two refrigerant flow paths (3*a* and 55*b*) communicating with each other. As a result, the O-ring 39 seals the periphery of the two communication ports (3*a*1 and 3*b*1), thereby suppressing leakage of the refrigerant from the joint portion between the motor housing 3 and the inverter housing 55 into and out of the motor housing 3 and the inverter housing 55.

Although the example in which the annular groove 3*e* is provided only in the former of the joint surface 3*b* of the motor housing 3 and the joint surface 55*a* of the inverter housing has been described, the annular groove may be provided only in the latter, or the annular groove may be provided in each of the former and the latter.

As illustrated in FIG. 5, on the joint surface 3*b* of the motor housing 3, the groove 3*d* is disposed between the sealing material 40 and the O-ring 39 in the surface direction. The sealing material 40 illustrated in FIG. 5 is a dry body of a liquid gasket. On the other hand, in FIG. 6, the liquid gasket 41 applied to the peripheral edge of the hollow 3*c* in the joint surface 3*b* is in a liquid state before drying. When the joint surface 3*b* of the motor housing 3 and the joint surface 55*a* of the inverter housing 55 are joined, the liquid gasket 41 existing therebetween spreads in the surface direction. Even if the liquid gasket 41 spreads in this manner, as illustrated in FIG. 6, the spread portion of the liquid gasket 41 flows into the groove 3*d* before reaching the O-ring 39 and is prevented from further spreading. As described above, since the groove 3*d* suppresses the adhesion of the liquid gasket 41 to the O-ring 39, the deterioration of the O-ring 39 due to the adhesion of the liquid gasket 41 can be suppressed.

The groove 3*d* has an arcuate shape curved with a curvature concentric with the annular groove 3*e* in which the O-ring 39 is set. Since the groove 3*d* having such a configuration can be arranged in a longer form in the peripheral region of the O-ring 39 as compared with a groove having a linear shape, it is possible to further increase the capacity inside the groove 3*d* and suppress overflow of the liquid gasket 41 from the groove 3*d*.

Although the example in which the groove 3*d* is provided only in the former of the joint surface 3*b* of the motor housing 3 and the joint surface 55*a* of the inverter housing 55 has been described, a groove may be provided only in the latter, or a groove may be provided in each of the former and the latter. In addition, although the example in which the communication ports (3*a*1 and 55*b*1) and the groove 3*d* are arranged outside the frame of the sealing material 40 having a frame shape has been described, the communication ports (3*a*1 and 55*b*1) and the groove 3*d* may be arranged inside the frame.

Figure 8:
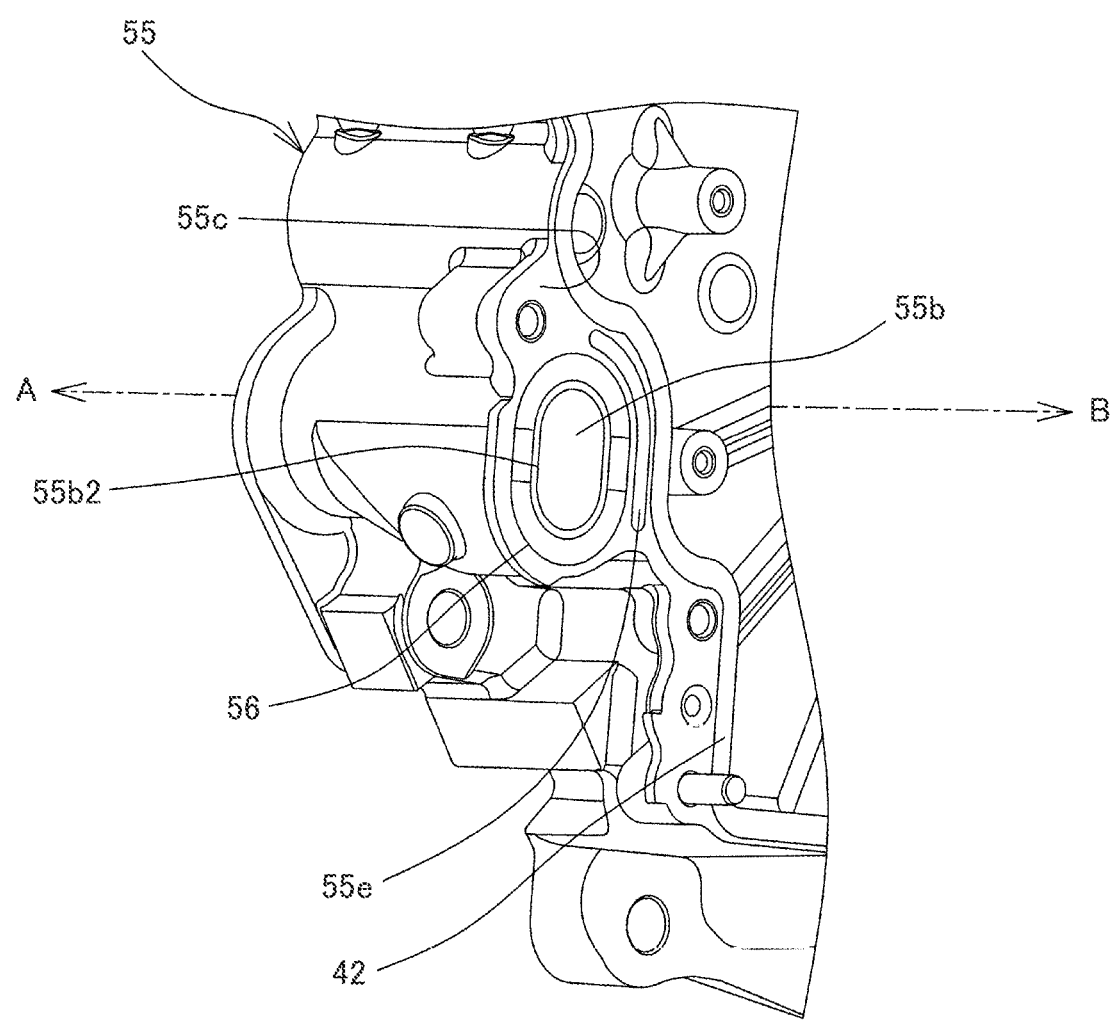
FIG. 8 is a partial perspective view illustrating a refrigerant flow path and a periphery thereof in the inverter housing.

FIG. 8 is a partial perspective view illustrating the refrigerant flow path 55*b* and the periphery thereof in the inverter housing 55. The inverter housing 55 includes a second joint surface 55*c* joined to the inverter cover (51 in FIG. 1) on the other side (arrow B direction side) in the rotation axis direction. The end on the other side in the rotation axis direction of the refrigerant flow path 55*b* of the inverter housing 55 opens toward the other side as a second communication port 55*b*2 on the second joint surface 55*c*. The second joint surface 55*c* is provided with a second annular groove surrounding the second communication port 55*b*2, and a second O-ring 56 is set in the second annular groove.

Figure 9:
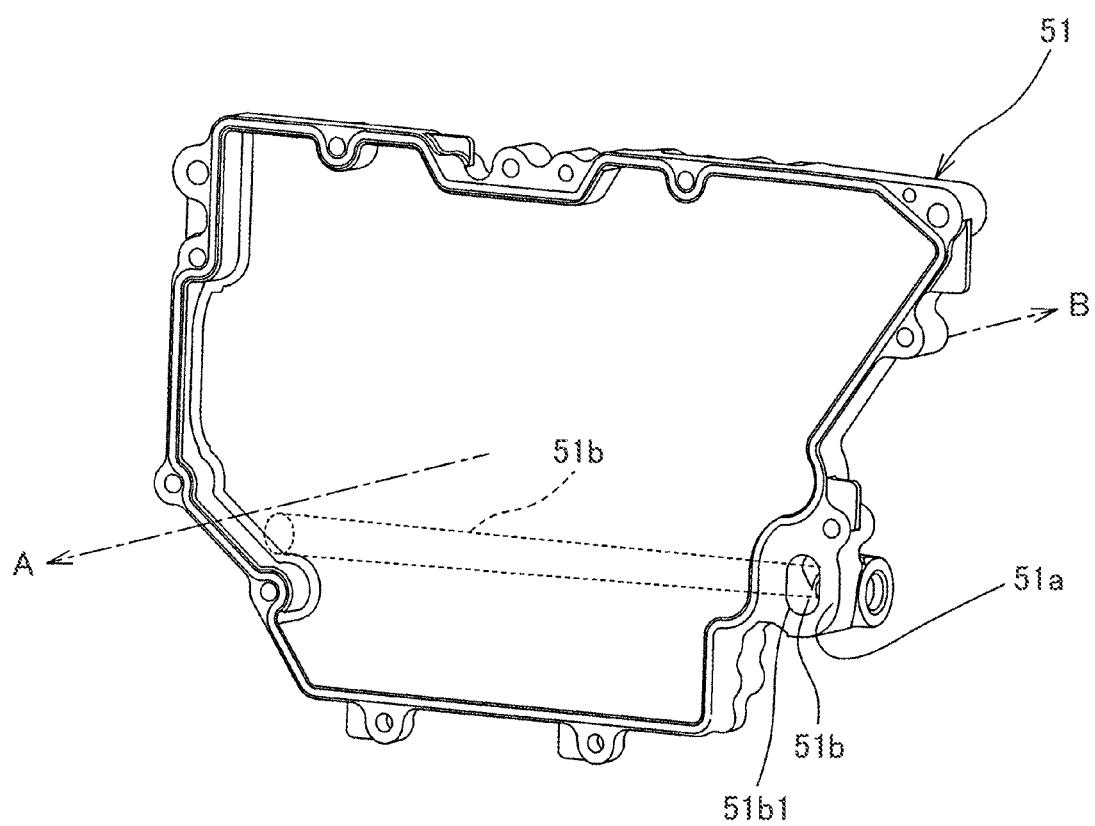
FIG. 9 is a perspective view illustrating an inverter cover of the motor from one side in a rotation axis direction.

FIG. 9 is a perspective view illustrating the inverter cover 51 from one side (arrow A direction side) in the rotation axis direction. The inverter cover 51 includes a joint surface 51*a* joined to the second joint surface (55*c* in FIG. 8) of the inverter housing and a refrigerant flow path 51*b*. One end of the refrigerant flow path 51*b* opens toward one side (arrow A direction side) in the rotation axis direction as a communication port 51*b*1 on the joint surface 51*a*. When the second joint surface 55*c* (FIG. 8) of the inverter housing 55 and the joint surface 51*a* (FIG. 9) of the inverter cover 51 are joined, the refrigerant flow path 55*b* of the inverter housing 55 and the refrigerant flow path 51*b* of the inverter cover 51 communicate with each other through the communication ports (55*b*2 and 51*b*1).

The second O-ring 56 illustrated in FIG. 8 is interposed between the inverter housing 55 and the inverter cover (51 in FIG. 9) and is disposed so as to surround the respective communication ports (55*b*2 and 51*b*) of the refrigerant flow paths (55*b* and 51*b*) communicating with each other. As a result, the second O-ring 56 can suppress the refrigerant leakage from the joint portion between the inverter housing 55 and the inverter cover 51 to the inside and outside of the inverter housing 55 and the inverter cover 51.

Although the example in which the second annular groove for the second O-ring 56 is provided only in the former of the second joint surface 55*c* of the inverter housing 55 and the joint surface 51*a* of the inverter cover 51 has been described, the second annular groove may be provided only in the latter, or the second annular groove may be provided in each of the former and the latter.

On the second joint surface of the inverter housing 55, a second sealing material 42 made of a dry body of a liquid gasket is disposed so as to surround the hollow of the inverter housing 55 with a predetermined width. The second sealing material 42 is interposed between the second joint surface 55*c* of the inverter housing 55 and the joint surface 51*a* of the inverter cover 51 to seal the hollow of the inverter housing 55 and the hollow of the inverter cover 51. According to the motor 1, the airtightness of the inverter housing 55 and the inverter cover 51 can be enhanced at low cost by the above-described sealing.

On the second joint surface 55*c* of the inverter housing 55, the second groove 55*e* is disposed between the second sealing material 42 and the second O-ring 56 in the surface direction. Even when the liquid gasket which is the precursor of the second sealing material 42 spreads in the surface direction at the time of application, the spread portion of the liquid gasket flows into the second groove 55*e* before reaching the second O-ring 56 and is prevented from further spreading. As described above, since the second groove 55*e* suppresses the adhesion of the liquid gasket to the second O-ring 56, deterioration of the second O-ring 56 due to the adhesion of the liquid gasket can be suppressed.

Although an example in which the second groove 55e is provided only in the former of the second joint surface 55c of the inverter housing 55 and the joint surface 51a of the inverter cover 51 has been described, a groove may be provided only in the latter, or a groove may be provided in each of the former and the latter. In addition, although an example in which each of the second communication port 55b2, the communication port 51b1, and the second groove 55e is disposed outside the frame of the second sealing material 42 having a frame shape has been described, they may be disposed inside the frame.

The refrigerant flow path 51b of the inverter cover 51 is provided inside the cover bottom wall and extends in a direction orthogonal to the rotation axis direction.

The refrigerant flowing into the refrigerant flow path 3a of the motor housing 3 through the liquid supply pipe 9 illustrated in FIG. 4 flows in the refrigerant flow path 3a to cool the motor housing 3, and then flows into the refrigerant flow path 55b of the inverter housing 55 illustrated in FIG. 7. Thereafter, the refrigerant flows in the refrigerant flow path 55b to cool the inverter housing 55, and then flows into the refrigerant flow path 51b of the inverter cover 51 illustrated in FIG. 9. Then, the refrigerant flows in the refrigerant flow path 51b to cool the inverter cover 51 and the IGBT module (52 in FIG. 10), and then is discharged to the outside through a waste liquid pipe (not illustrated). The discharged refrigerant is sent to the cooling device through the external pipe to be cooled, and then sent again to the liquid supply pipe 9 of the motor unit 2.

Figure 10:
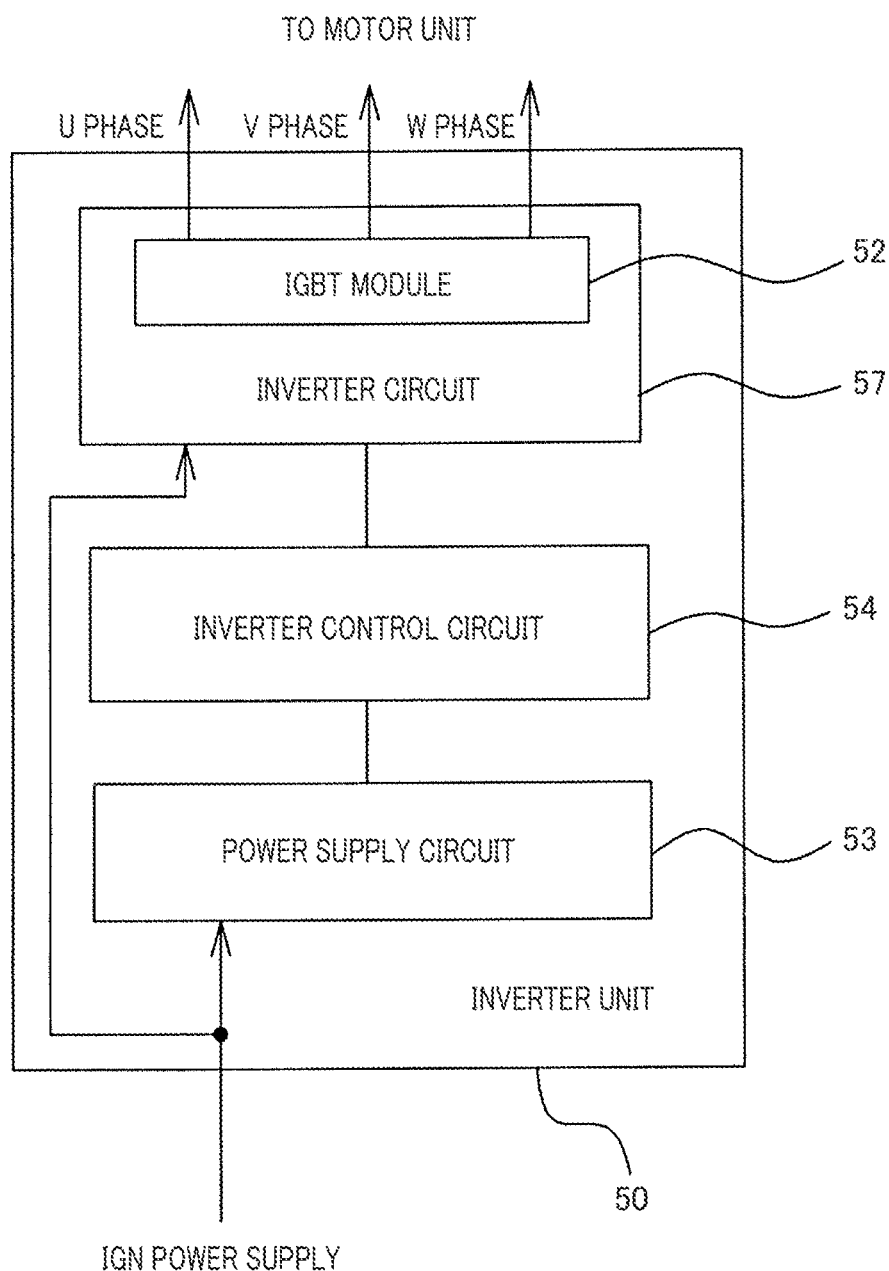
FIG. 10 is a block diagram illustrating a circuit configuration of an inverter unit of the motor.

FIG. 10 is a block diagram illustrating a circuit configuration of the inverter unit 50. The inverter unit 50 includes a power supply circuit 53, an inverter control circuit 54, and an inverter circuit 57. An ignition power supply of the vehicle is supplied to the power supply circuit 53 and the inverter circuit 57. The power supply circuit converts the voltage of the ignition power supply into a stable 5 V power supply, and supplies the 5 V power supply to the inverter control circuit 54. The inverter control circuit 54 controls the inverter circuit 57 in accordance with a control signal transmitted from the host device. The inverter circuit 57 includes the IGBT module 52 described above.

The power supply circuit 53, the inverter control circuit 54, and the inverter circuit 57 except for the IGBT module 52 are housed in the inverter housing (55 in FIG. 1). As described above, the IGBT module 52 is housed in the inverter case (51 in FIG. 1).

Although the example in which the present invention is applied to the motor 1 has been described, the present invention may be applied to a generator (dynamo).

The present invention is not limited to the above-described embodiment, and a configuration different from the embodiment can be adopted within a range where the configuration of the present invention can be applied. The present invention has unique effects for each aspect described below.

FIRST ASPECT

A first aspect is an electric device including a housing (for example, the inverter housing 55) and a cover (for example, the inverter cover 51) that covers an opening of the housing, or a first housing (for example, the motor housing 3) and a second housing (for example, the inverter housing 55), each of the housing and the cover, or each of the first housing and the second housing including a joint surface (for example, the joint surface 3b and the joint surface 55a, or the second joint surface 55c and the joint surface 51a) to be joined to each other, and a liquid path (for example, the refrigerant flow paths 3a, 55b, and 51b) serving as a refrigerant flow path, each liquid path being opened as a communication port at the joint surface and communicating with each other; and a sealing material (for example, the sealing material 40 and the second sealing material 42) interposed between each joint surface, and an O-ring (for example, the O-ring 39 and the second O-ring 56), wherein the O-ring is interposed between the housing and the cover or between the first housing and the second housing, and is disposed to surround each communication port of each liquid path communicating with each other, and at least one of the housing and the cover or at least one of the first housing and the second housing includes a groove (for example, the groove 3d and the second groove 55e) disposed between the sealing material and the O-ring on the joint surface in a surface direction of the joint surface.

According to the first aspect of such a configuration, refrigerant leakage from the joint portion between the housing and the cover or the joint portion between the first housing and the second housing can be suppressed by the O-ring. In addition, according to the first aspect, the groove disposed on the joint surface of at least one of the housing and the cover or the joint surface of at least one of the first housing and the second housing suppresses adhesion of the liquid gasket to the O-ring, so that deterioration of the O-ring due to adhesion of the liquid gasket can be suppressed. Furthermore, according to the first aspect, the sealing material, which is a dry body of the liquid gasket interposed between the joint surfaces of the housing and the cover or the joint surfaces of the first housing and the second housing, can enhance the airtightness of the housing and the cover or the first housing and the second housing at low cost.

SECOND ASPECT

A second aspect includes the configuration of the first aspect, wherein the housing includes an inverter housing that houses a control substrate, and the cover includes an inverter cover that closes an opening of the inverter housing.

According to such a configuration, refrigerant leakage from the joint portion between the inverter housing and the inverter cover can be suppressed by the O-ring, deterioration of the O-ring due to adhesion of the liquid gasket can be suppressed, and airtightness of the inverter housing and the inverter cover can be suppressed at low cost.

THIRD ASPECT

A third aspect is a motor as the electric device according to the configuration of the first aspect, wherein the first housing includes a motor housing that houses a shaft, a rotor, and a stator, and the second housing includes an inverter housing that houses a control substrate.

According to the third aspect, the deterioration of the O-ring due to the adhesion of the liquid gasket can be suppressed while suppressing the refrigerant leakage from the joint portion between the motor housing and the inverter housing by the O-ring. In addition, according to the third aspect, the airtightness of each of the motor housing and the inverter housing can be enhanced at low cost.

FOURTH ASPECT

A fourth aspect is a motor according to the configuration of the third aspect, the motor including: an inverter cover that closes an opening of the inverter housing, each of the inverter housing and the inverter cover including a joint surface joined to each other and a liquid path serving as a refrigerant flow path, each liquid path of the inverter housing and the inverter cover being opened as a communication port at the joint surface and communicating with each other, wherein a second sealing material (for example, the second sealing material 42) and a second O-ring (for example, the second O-ring 56) interposed between the joint surface of the inverter housing and the joint surface of the inverter cover are disposed, the O-ring is disposed to surround each of the communication port of the inverter housing and the communication port of the inverter cover that communicate with each other, and at least one of the inverter housing and the inverter cover includes a second groove disposed between the second sealing material and the second O-ring on the joint surface in a surface direction of the joint surface.

According to the fourth aspect, for each of the joint portion between the motor housing and the inverter housing and the joint portion between the inverter housing and the inverter cover, refrigerant leakage from the joint portion can be suppressed by the O-ring and the second O-ring. Furthermore, according to the fourth aspect, the deterioration of the O-ring and the second O-ring due to the adhesion of the liquid gasket can be suppressed for each of the two connection portions, and the airtightness of the motor housing, the inverter housing, and the inverter cover can be suppressed at low cost.

FIFTH ASPECT

A fifth aspect is the electric device according to the first aspect, wherein the groove has an arcuate shape curved with a curvature concentric with an annular groove (for example, the annular groove 3e) in which the O-ring is set.

According to the fifth aspect, since the groove can be arranged in a longer form as compared with the configuration in which the shape of the groove is linear, it is possible to further increase the capacity inside the groove and suppress overflow of the liquid gasket from the groove.

The present invention claims priority based on Japanese Patent Application No. 2020-049262 filed on Mar. 19, 2020, the entire contents of which are incorporated herein by reference.

What is claimed is:

1. An electric device comprising:
a housing and a cover that covers an opening of the housing, or a first housing and a second housing,
each of the housing and the cover, or each of the first housing and the second housing including a joint surface to be joined to each other, and a liquid path serving as a refrigerant flow path,
each liquid path being opened as a communication port at the joint surface and communicating with each other; and
a sealing material interposed between each joint surface, and an O-ring, wherein
the O-ring is interposed between the housing and the cover or between the first housing and the second housing, and is disposed to surround each communication port of each liquid path communicating with each other,
each of the communication port and the O-ring is disposed outside a frame of the sealing material having a frame shape in a surface direction of the joint surface, and
at least one of the housing and the cover or at least one of the first housing and the second housing includes a groove disposed between the sealing material and the O-ring on the joint surface in a surface direction of the joint surface.

2. The electric device according to claim 1, wherein
the housing includes an inverter housing that houses a control substrate, and
the cover includes an inverter cover that closes an opening of the inverter housing.

3. A motor as the electric device according to claim 1, wherein
the first housing includes a motor housing that houses a shaft, a rotor, and a stator, and
the second housing includes an inverter housing that houses a control substrate.

4. The motor according to claim 3, comprising
an inverter cover that closes an opening of the inverter housing,
each of the inverter housing and the inverter cover including a joint surface joined to each other and a liquid path serving as a refrigerant flow path,
each liquid path of the inverter housing and the inverter cover being opened as a communication port at the joint surface and communicating with each other, wherein
a second sealing material and a second O-ring interposed between the joint surface of the inverter housing and the joint surface of the inverter cover are disposed,
the O-ring is disposed to surround each of the communication port of the inverter housing and the communication port of the inverter cover that communicate with each other, and
at least one of the inverter housing and the inverter cover includes a second groove disposed between the second sealing material and the second O-ring on the joint surface in a surface direction of the joint surface.

5. The electric device according to claim 1, wherein
the groove has an arcuate shape curved with a curvature concentric with an annular groove in which the O-ring is set.

* * * * *